May 10, 1949.   D. C. GRESHAM   2,469,689
METHOD OF MAKING APERTURED METAL SHEETS
Filed March 23, 1945   2 Sheets-Sheet 1
FIG. 3 A.
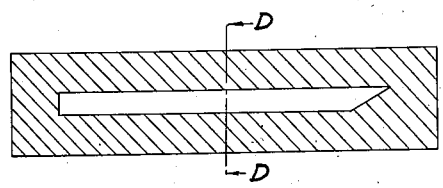
FIG. 3 B.
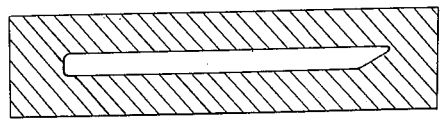
FIG. 3 C.
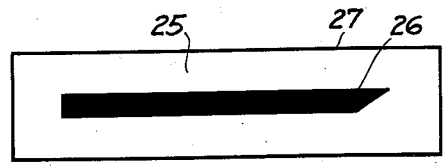
FIG. 3 D.
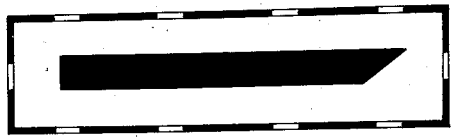
FIG. 4 B.
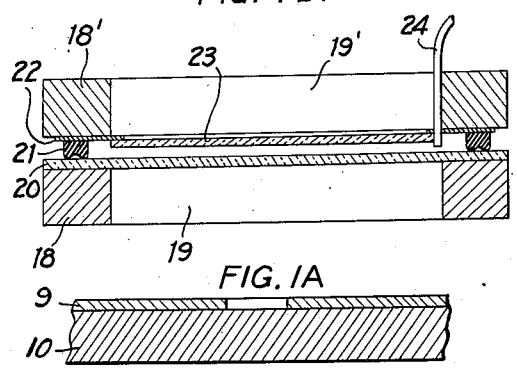
FIG. 4 A.
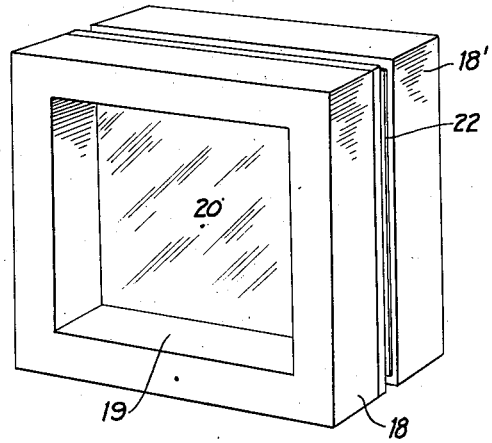
FIG. 1A
FIG. 1B
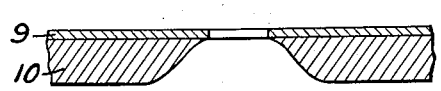
FIG. 4C.
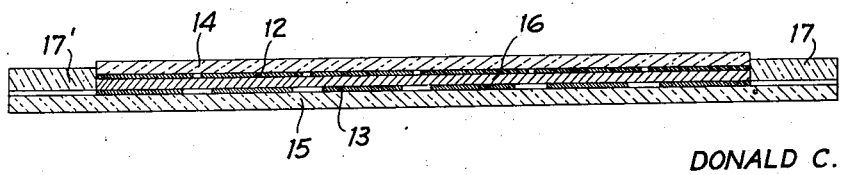
FIG. 1C
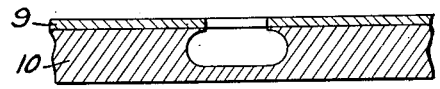
DONALD C. GRESHAM
INVENTOR
BY
ATTORNEYS May 10, 1949. D. C. GRESHAM 2,469,689
METHOD OF MAKING APERTURED METAL SHEETS
Filed March 23, 1945 2 Sheets-Sheet 2
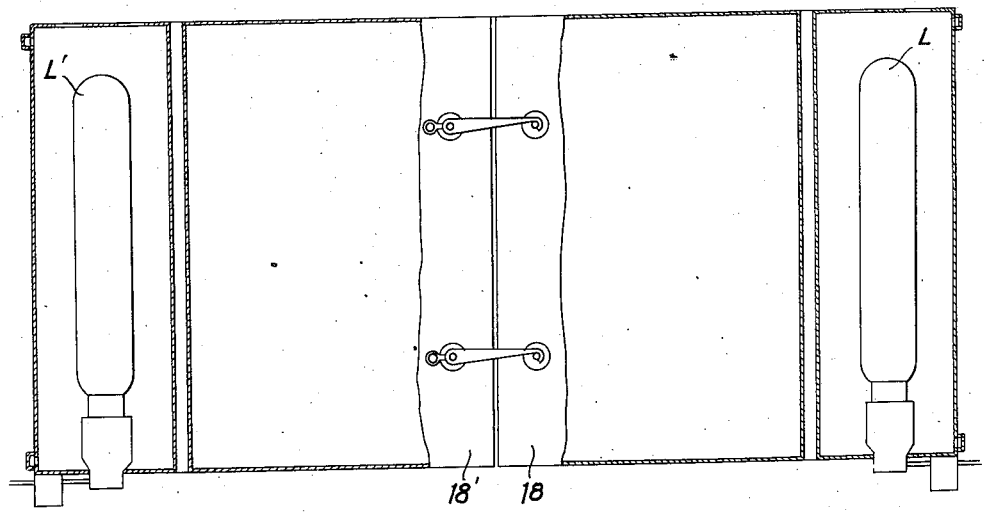
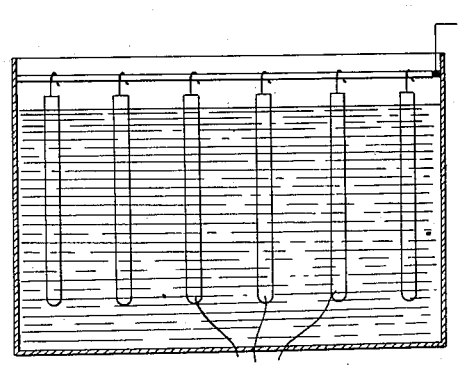
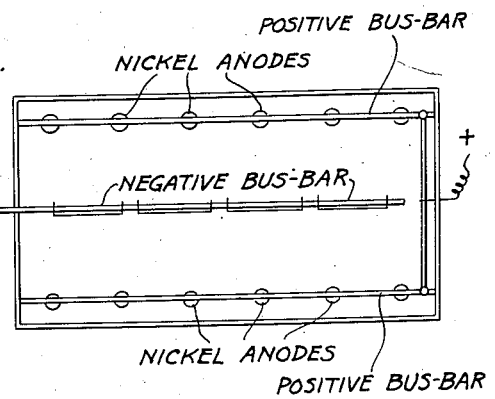
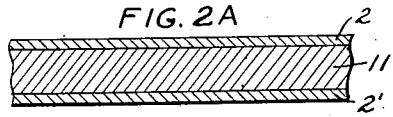
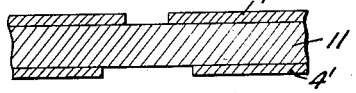
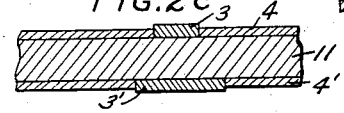
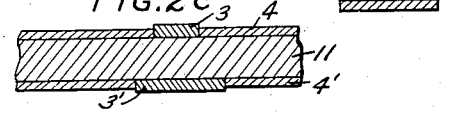
DONALD C. GRESHAM
INVENTOR
BY
ATTORNEYS Patented May 10, 1949

2,469,689

UNITED STATES PATENT OFFICE 2,469,689

METHOD OF MAKING APERTURED METAL SHEETS

Donald C. Gresham, Wealdstone, England, assignor to Eastman Kodak Company, Rochester, N. Y., a corporation of New Jersey Application March 23, 1945, Serial No. 584,453
In Great Britain March 25, 1944

2 Claims. (Cl. 204—24)

The invention relates to the making of articles shaped by etching.

For some purposes it is necessary to be able to make articles having holes (which term means any shape of hole, such as slots) with extremely thin and sharp edges in a relatively thick article. The present invention is directed to a method of making such articles in a relatively simple and repeatable manner. The invention gives an improved ease of producing holes accurately to a predetermined size with sharp outlines and without distorting the shape particularly where the outline has sharp angles which would by most known methods commonly used become rounded.

As a part of some highly precise instruments there is often required a metal foil or foils having highly precise holes or slots. An illustration is a pair of rotating diaphragms as used in some optical work. The invention can also be employed to make invert half-tone printing forms for printing in intaglio. Not only must the holes or slots have an unusually high degree of precision but at the same time the foil must be robust. For instance, if holes are made by some known manner in metal foil of say two-thousandths of an inch thick, the sharpness of the edges of the holes is determined by this thickness and therefore while being fairly sharp, the foil itself is too flimsy. If the foil is made thicker, say one-hundredth of an inch, then the kind of hole usually obtained, for instance by etching from both sides, has rounded edges.

To combine sharpness of edge and robustness is a difficult problem. Although it is possible to achieve the result by first forming a metal foil, with the desired holes (for instance, by the method described in Loening U. S. application Serial No. 580,290, and then after placing it on a temporary backing, forming a resist, and plating the remainder with a metal deposit, and repeating this say twice more using resists and making further metal depositions, and finally removing the temporary backing and the resists, the result is not entirely satisfactory apart from the tedious and troublesome nature of the whole process.

We have now solved this problem of combining sharpness of edge and robustness in what we believe is a novel manner and gives results not obtainable, as far as we are aware, by any other known method.

In the drawing, Figs. 1A to 1C are sectional views of a single layer plate;

Figs. 2A to 2E are sectional views of a two-layer plate;

Figs. 3A to 3D are views partly in section and partly in plan showing apertures etched by my method;

Fig. 4A is a perspective view of a vacuum frame used in my invention, Fig. 4B is a view in section of the vacuum frame and Fig. 4C is a sectional view of an assembly with my etched plate;

Fig. 5 is a view partly in section of an exposing box used in my invention;

Fig. 6A is a sectional view of a plating bath and

Fig. 6B is a plan view of the plating apparatus.

In the present invention we start with an imperforate sheet which will ultimately form a permanent strengthening plate and we form the foil on it by deposition and then etch away the strengthening plate opposite the holes in the foil.

For instance, in performing the invention we can use two different substances of such nature that when both together are made the anode in an electrolytic bath and a current is passed from such anode to a cathode, the one substance is preferentially removed electrolytically from the anode. Two such substances are nickel and copper; if the nickel foil with the holes is first formed by deposition of nickel on a copper strengthening plate and then together they are made the anode in a so-called copper plating bath then the copper is etched while the nickel is not etched (or hardly at all).

In using two such substances according to the invention, a thin design indicated as 9 in Fig. 1 can be formed by deposition of the less etchable substance (which is preferably a metal) on the surface of the mort etchable substance forming the strengthening base 10 by first forming a negative photographic resist on the strengthening base and then depositing the less etchable substance in places unprotected by the resist, so as to form the foil, whereafter the whole (for instance a design in nickel foil on a copper strengthening base) is then made the anode in an electrolytic bath, and current is passed to etch away the strengthening base opposite the holes in the foil to give the result shown in Fig. 1B. However, if this etching is not continued until the strengthening base is perforated, the result will be as shown in Fig. 1C; this illustrates the kind of cavity which is useful in the production of invert half-tone printing forms for printing by intaglio. Instead of etching electrolytically, chemical etching can be used but is usually not so good; thus in the case of a nickel foil design on a copper plate, etching can be done by simply applying a solution of ferric chloride or dilute nitric acid.

The invention is especially valuable when in order to obtain the maximum robustness two metal foil designs are formed in register on both sides of the strengthening base which gives a result greatly superior to that obtained when the metal foil design is formed on the one side only.

In a preferred method of performing the invention the said design is formed photographically, for example, by first coating on both sides of the strengthening base light sensitive layers of bichromated glue in known manner, exposing the latter in register to an image or images and forming resists therein in known manner, forming the foil thereon by deposition on the unprotected areas on both sides of the said base, then removing the resists and subsequently making the whole the anode in an electrolytic bath and passing current therethrough until the base but not the foil is so removed that holes are formed right through the base which are of a greater width than the holes in the foil.

The photographic resists can be formed in other ways, for instance by coating light sensitive silver salt emulsion (e. g. a gelatino-silver halide emulsion) layers instead of gum bichromate or by the process described in U. S. application Serial No. 566,027, now Patent 2,459,129, granted January 11, 1949; or finished photographic images or finished resists can be transferred from other supports.

The invention is illustrated by the following example which illustrates the production of slots in metal sheets. All the drawings herein are, of course, purely diagrammatic. The procedure is as follows:

(1) Two photographic positives are made of a desired graticule, one having clear lines (on an opaque background) of exactly the width of the required slots as shown in plan in Fig. 3A, and the second (not shown) having similar clear lines but about 2 or 3 times as wide.

(2) A sheet 11 of copper of 0.012 inch thick shown in section in Fig. 2A is coated on both sides with bichromated glue 2 and 2'.

(3) One side is then exposed to the first positive and the other side to the second positive, the lines of the first positive registering with the centres of the lines of the second positive.

(4) Then resists are formed in known manner in the two glue layers. The resists are preferably burnt-in as in the standard practice of half-tone block making. The sheet 11 is now shown in Fig. 2B bearing the resists 3 and 3'.

(5) After suitable chemical cleaning, the unprotected copper on both sides of the sheet is electro-nickel plated to form a foil of a thickness of only about one half of one thousandth of an inch as shown in Figure 2C.

(6) The resists are then removed by boiling the sheet in caustic soda solution. The sheet is now shown in Fig. 2D where 4 and 4' show the nickel plating.

(7) The composite sheet is then made the anode in a copper electro-plating bath and the copper alone is etched out from both sides simultaneously until there are not only slots formed right through the copper but the copper has also been removed to a greater width (at least in the center of the thickness of the sheet) than the width of the slots in the nickel. This result is shown in section in Fig. 2E.

By forming the design by depositing the nickel in the spaces of a photographically formed resist, extremely sharp and clean edges to the nickel deposit can be formed. While Fig. 2E shows in section the striking result obtained according to the invention Figs. 3B and 3D illustrate this further in plan. Fig. 3B shows the kind of result obtained by most prior methods and it will be observed that the sharp corners of the slot are rounded, whereas Fig. 3C shows that the sharpness of the corners is as great as that of the original drawing of Fig. 3A. It should be pointed out that Fig. 2E is a section across D—D of Fig. 3A.

The following description illustrates in greater detail the making of a number of graticules of the kind shown in Fig. 3A, each consisting of a very small metal sheet 25 containing very narrow slots 26 of the shape illustrated in Figs. 2E and 3A. The steps in making these graticules are as follows:

*Part I.—Preparation of printing negatives*

(1) A negative drawing of the desired graticule is prepared 40 times final size on white lacquered metal. This drawing consists of a white background 25 (representing the metal of the desired graticule) on which is drawn the slot 26 as a thick black line and the perimeter 27 also as a black line.

(2) The metal sheet bearing such drawing is set up on a large camera as used for photo-template work and a positive is made on a silver halide emulsion at ¼-reduction, thus giving a reproduction of ten times final size.

(3) From such positive two negative contact prints are made.

(4) One of these negative prints is now modified by drawing over it with India ink, adding 0.1" to all sides of each slot and making some small breaks in the perimeter line by painting over it with white ink. This altered print will be the original for the back image and the small breaks will provide tie-bars to hold the etched graticules into the sheet at the final stage.

(5) The negative prints are now set up on a precision camera, as normally used for making graticule negatives and reduced very accurately to final size to give positive images.

(6) From the so formed positive with the wide slot, a contact print is made and processed by reversal to give a "mirror-image" positive.

(7) From each of these positives from step (3) and step (6) a step-and-repeat negative is made on a step-and-repeat camera. It has been found that a stepped-up negative bearing eight images in one direction and six in the other is a convenient size.

(8) The stepped-up negative is used as a master from which positive transparencies are made by contact.

(9) The edges of the wide line positive transparencies are now cut off close to the images and the offcuts are kept carefully. The pairs of positives are registered face to face, so that the slots on the fine-slot positive are in the centre of the slots on the wide-slot positive, and fastened together with bulldog clips.

(10) The edges which were cut from the wide-slot positive are now matched up again and stuck firmly to the fine-slot positive with glue while the cut-down positive is still clipped in position. When the glue is dry the bulldog clips are removed and the cut-down positive can be dropped out of the glass frame formed on the larger one. This ensures that whenever the cut-down positive is dropped into the frame the images on the two positives will come into register (see step 18 below).

*Part II.—Preparation of graticules from negatives*

(11) A sheet of polished "photogravure" copper 0.012" thick is cut very slightly smaller than the cut-down positive. Great care is taken to ensure that no burr is left on the edges and that there are no turned-up corners.

(12) The copper is cleaned by dipping into a tank of the following solution for 5 seconds:

Concentrated hydrochloric acid _____ cc__ 75
Concentrated nitric acid _____ cc__ 25

The plate is drained, rinsed in a 0.05% solution of wetting agent and dried on a whirler which has been fitted so that the plate can be supported by the corners without the underside coming into contact with anything.

(13) The plate, while still on the whirler, is dusted carefully and a liberal quantity of the following solution is poured on and spread to the edge with a glass rod:

Phenol-formaldehyde resin _____ gm__ 80
Ethyl acetate _____ cc__ 200
Oil soluble yellow (color index No. 24) __gm__ 4
"Waxoline red" (color index No. 258) __gm__ 4

The whirler is then started and run at 800 R. P. M. until the coating is dry.

(14) The plate is turned over and the other side is coated in exactly the same way. The resin solution gets thicker as the volatile solvent evaporates and ethyl acetate has to be added from time to time.

(15) The plate, coated on both sides, is suspended by its edge in an oven at 75° C. for 5 minutes and then removed and cooled to room temperature.

(16) The plate is replaced on the whirler and coated at 800 R. P. M. with a solution made as follows:

Disperse 75 gm. of gum acacia in 300 cc. of distilled water containing 0.25% of chloroform. To 90 cc. of this dispersion add 10 cc. of 20% ammonium dichromate solution.

(17) The plate is turned over and the other side is coated in the same way.

(18) The copper sheet, sensitised on both sides, is now placed within the glass edging on the fine-slot positive and the wide-slot positive is dropped in on top of it. This assembly is shown in section in Fig. 4c. The fine-slot positive is shown as 12 and the wide-slot positive as 13, their glass supports being 14 and 15 respectively. The copper plate between them is shown as 16. The said off-cuts mentioned in step (10) are shown as 17 and 17'.

This assembly is then put in a special vacuum pressure frame which has been developed for this process.

This vacuum frame is shown in perspective in Fig. 4A and in section in Fig. 4B where 18 and 18' are two frames hinged together and having apertures 19 and 19'. The frame 18 has a glass sheet 20 covering it. The frame 18' has a rubber bead 21 stuck to a rubber apron 22 which is stuck to the frame 18'. On the inner side of the rubber apron there is stuck a sheet of cellulose acetate 23 so that when the whole frame is closed, the space between the glass window 20 and cellulose acetate window 23 is quite air tight and can be evacuated by suction through the tube 24. The assembly shown in Fig. 4C is placed between the sheets 20 and 23 and then the frame is evacuated.

(19) Both sides of the vacuum frame may be successively exposed for 6 minutes at 18" from a 20A open arc lamp, care being taken that the vacuum in the frame is maintained while the frame is turned over but we prefer to use the special exposing box shown in Fig. 5 having a high intensity, mercury vapor lamp L and L' at each end and the double-sided vacuum frame 18 and 18' between them. This will allow both exposures to be made simultaneously.

(20) The copper plate is removed from between the positives and all the gum coating on both sides which has not been light-hardened is washed out by spraying both sides of the plate with cold water, and finally rinsing it in a dish of water at 80–85° F., leaving on the copper surfaces a coating of Bakelite, on which are hardened gum areas where the slots are to be formed ultimately.

(21) The copper plate is dried on the whirler and then slightly warmed in a warm air current.

(22) The copper plate is laid fine-slot image side upwards on a sheet of clean, warmed blotting paper and developed with lactic acid containing 10% of ethyl lactate which is gently swabbed over the plate with a pledget of cotton-wool. This is continued until all the phenol-formaldehyde layer which is unprotected by the gum stencil has been dissolved.

(23) The action of the developing solution is then immediately stopped by swabbing over with 50% lactic acid and water. This also has the effect of removing the hardened gum stencil.

(24) The plate is turned over, placed on a clean sheet of blotting paper and the development process is carried out on the back exactly as described for the front.

(25) Both sides are now vigorously swabbed with 50% lactic acid to make sure that every trace of hardened gum is removed, leaving on each side a negative image of phenolformaldehyde resin only. The plate is then washed thoroughly and whirled dry.

(26) The plate is suspended by its edge for 30 minutes in an oven at 140° C., removed and cooled to room temperature.

(27) The plate is then connected as the anode in an electrolytic cleaning bath. The bath consists of:

Potassium cyanide _____ gm__ 50
Sodium carbonate, anhy _____ gm__ 100
Water to _____ cc__ 1000

The cathode is of rolled copper and a current is passed for 5 seconds with a potential difference across the electrodes of 6 volts.

(28) The plate is rinsed in water and dipped in 10% sulphuric acid.

(29) Without draining the plate is put into the nickel plating bath as the cathode, as shown in Fig. 6A and 6B, and arrangements are made for the potential difference between the electrodes to be 2.25 volts. The plating bath is made from a standard nickel plating mixture. The anodes are standard nickel ones arranged on both sides of the plate and the bath is adjusted daily, to a pH of 5.6 with dilute sulphuric acid. (The carry-over of acid from the acid-dip is almost sufficient to keep the pH constant and this is the reason for not draining the plate before putting it in the plating bath.) The density of the bath is maintained at 13° Twaddell and the inter-electrode distance is 10 cm. Care is taken that the current is switched on before the plate is introduced into the bath and the plating is continued for 45 minutes at 65° F.

(30) The nickel plated sheet is removed from the plating bath, rinsed and boiled in the following solution until all the phenol-formaldehyde resin resist is removed:

Sodium hydroxide _____gm\_\_ 20
Methylated spirit _____cc\_\_ 10
Water to _____cc\_\_ 100

The plate is then washed in cold water.

(31) The plate is now made the anode in a bath of 20% copper sulphate with a potential difference of 10 volts between the electrodes until the slots of the graticule have been etched right through as required. This takes about 15 minutes.

(32) The plate, now etched so that the graticules are just holding in by thin tie-bars on the back is washed and dried and the individual graticules are broken out of the sheet.

I claim:

1. The method of making an apertured sheet of composite copper and nickel layers, which comprises forming in the same zone on both sides of a relatively thick imperforate copper sheet, non-conductive colloid stencils covering both sides of said copper sheet where said aperture is required, depositing on the parts of both sides of said copper sheet not protected by said stencils, thin layers of nickel, then removing said stencils and making the copper sheet the anode in a copper plating bath and passing an electric current between said anode and a cathode until the copper at the parts of said copper sheet where the nickel is absent is removed to a greater width than the width of the aperture in the nickel foil.

2. The method according to claim 1 in which said stencil is composed of areas which are larger on one side of said copper sheet than corresponding areas on the opposite side of said sheet.

DONALD C. GRESHAM.

REFERENCES CITED

The following references are of record in the file of this patent:

UNITED STATES PATENTS

| Number | Name | Date |
|---|---|---|
| 378,423 | Baynes | Feb. 28, 1888 |
| 2,226,383 | Norris | Dec. 24, 1940 |
| 2,282,203 | Norris | May 5, 1942 |
| 2,332,592 | Norris | Oct. 26, 1943 |